(12) United States Patent
Schwam

(10) Patent No.: US 6,761,144 B2
(45) Date of Patent: Jul. 13, 2004

(54) ROTARY ENGINE WITH COUNTER-ROTATING HOUSING AND OUTPUT SHAFT MOUNTED ON STATIONARY SPINDLE

(76) Inventor: Paul A. Schwam, 510 N. Stone Ave., Tucson, AZ (US) 85705

( * ) Notice: Subject to any disclaimer, the term of this patent is extended or adjusted under 35 U.S.C. 154(b) by 0 days.

(21) Appl. No.: 10/417,364

(22) Filed: Apr. 16, 2003

(65) Prior Publication Data

US 2003/0213460 A1 Nov. 20, 2003

Related U.S. Application Data

(60) Provisional application No. 60/381,625, filed on May 17, 2002.

(51) Int. Cl.[7] .................... F02B 53/00; B64C 11/00; B64C 27/00
(52) U.S. Cl. ................ 123/242; 416/128; 416/129; 418/61.2; 418/161; 418/164
(58) Field of Search .................. 418/61.2, 86, 161, 418/164; 123/242, 207, 206, 44 R; 416/128, 129

(56) References Cited

U.S. PATENT DOCUMENTS

| | | | |
|---|---|---|---|
| 1,052,658 A | 2/1913 | Escher | |
| 1,151,568 A | 8/1915 | Conill | |
| 1,461,436 A | 7/1923 | Arrigoni | |
| 1,561,424 A | 11/1925 | Exel | |
| 1,594,035 A | 7/1926 | Bailey | |
| 1,841,841 A | 1/1932 | Munn | |
| 2,336,787 A | 12/1943 | Hockney | |
| 2,419,787 A | 4/1947 | Muffly | |
| 2,838,123 A | 6/1958 | Olcott | |
| 2,988,065 A | 6/1961 | Wankel et al. | |
| 3,554,666 A | 1/1971 | Conkle | |
| 3,602,203 A | 8/1971 | Mowry | |
| 3,799,473 A | 3/1974 | Bortel | |
| 4,056,746 A | 11/1977 | Burtis | |
| 4,916,892 A | * 4/1990 | Pope | 416/129 |
| 5,112,191 A | * 5/1992 | Strock et al. | 416/129 |
| 6,193,189 B1 | 2/2001 | Keever | |
| 6,220,906 B1 | * 4/2001 | Dubois | 416/128 |

FOREIGN PATENT DOCUMENTS

FR   397499   5/1909

* cited by examiner

Primary Examiner—Sheldon J. Richter
(74) Attorney, Agent, or Firm—Antonio R. Durando; Durando, Birdwell & Janke, P.L.C.

(57) ABSTRACT

A counter-rotating rotary-piston engine has an output shaft with a cylindrical inner cavity rotatably mounted on a single support spindle in the frame of an aircraft. The output shaft extends substantially through the length of the engine block, which is suitably journaled on the shaft or the spindle to permit its counter-rotation. Internal combustion power is transmitted to the output shaft by means of an inner rotary piston fixed to the shaft which cooperates in conventional manner with an outer working chamber in the engine block, thereby producing concurrent rotation of the shaft and counter-rotation of the engine block. Dual propellers mounted on the shaft and on the block improve thrust performance, balance the torques and moments of inertia of the two counter-rotating masses, and virtually eliminate any resultant torque to the aircraft.

57 Claims, 15 Drawing Sheets

ROTARY ENGINE WITH COUNTER-ROTATING HOUSING AND OUTPUT SHAFT MOUNTED ON STATIONARY SPINDLE

RELATED APPLICATIONS

This application is based on Provisional Ser. No. 60/381,625, filed on May 17, 2002.

BACKGROUND OF THE INVENTION

1. Field of the Invention

This invention is related in general to the field of counter-rotating engines and, in particular, to a novel configuration for a rotary engine that enables the advantageous counter-rotation of the engine's shaft and block for suitable applications.

2. Description of the Related Art

All internal combustion engines share the characteristic of transforming the pressure generated by the combustion of a fuel into the useful rotation of a shaft. Piston engines cause the rotation of the shaft by expanding the combustion gases between a stationary cylinder and a movable piston connected to the shaft. Turbine engines similarly utilize the expansion of combustion gases between an array of stationary blades and a corresponding array of rotatable blades attached to an output shaft.

Thus, in typical applications the engine is firmly mounted on a support structure and delivers power to a useful load by means of a rotating output shaft. In aviation applications, the engine is attached to the body of the aircraft and a propeller is mounted on the shaft to produce propulsion. As a result of the torque produced by the operation of the engine on the rotating shaft and propeller, an opposite reactive torque is produced on the stationary parts of the engine and the frame of the airplane to which it is attached.

Aviation engineers have long searched for ways to reduce the instability that results from this reactive torque. One way has been to provide two propellers that rotate in opposite directions to produce symmetrical counter-balancing actions and reactions, either in twin-engine or in single-engine configurations. The twin-engine solution can obviously be implemented with any kind of power plant, including reciprocating-piston engines, simply by providing opposite directions of propeller rotation in each engine.

The single-engine solution to achieving counter-rotating propeller propulsion has been explored in aviation technology by allowing both the rotation of the crankshaft and the counter-rotation of the cylinders of a reciprocating-piston engine. This approach involves counter-rotating structures (engine block and crankshaft) which support two propellers rotating in opposite directions to each other, which results in a greater amount of propelling force and a substantially perfect torque balance. To that end, the combustion-chamber/crankcase configuration of internal-combustion engines has been modified in various manners over the years to attain a well balanced counter-rotating propeller system. See, for example, the solutions provided by Escher (U.S. Pat. No. 1,052,658), Conill (U.S. Pat. No. 1,151,568), Exel (U.S. Pat. No. 1,561,424), Hockney (U.S. Pat. No. 2,336,787), Muffly (U.S. Pat. No. 2,419,787), Olcott (U.S. Pat. No. 2,838,123), Conkle (U.S. Pat. No. 3,554,666), Keever (U.S. Pat. No. 6,193,189), and Canton (French Patent No. 397,499).

These patents describe four-cycle reciprocating-piston engines designed to balance opposite torques internally either by means of two counter-rotating output shafts connected to multiple crankshafts originating from a stationary enclosure, or by a rotating crankshaft cooperating with a counter-rotating combustion-chamber enclosure. The various solutions disclosed in these patents involve complicated engine mounting, inlet/exhaust porting and lubricating systems, all of which greatly affected their practical implementation.

The very nature of four-cycle reciprocating-piston engines, which comport the use of cranks in the output shaft and pistons traveling radially with respect to the axis of rotation of the crankshaft and cylinders, produces an inherently heavy and precarious structure that requires bearing supports at both ends of the engine. In addition, because each piston operates radially from a corresponding crank in the output shaft, access to the combustion chamber for fuel delivery is necessarily limited to the distal end of each cylinder, which presents very difficult problems during rotation of the cylinders. Lubrication is similarly complicated by centrifugal-force effects that tend to cause the accumulation of oil below each piston and away from the crankshaft. Accordingly, no counter-rotating engine has been successfully implemented commercially using four-cycle reciprocating-piston configurations in spite of the theoretical advantages provided by this concept.

Since reciprocating-piston engines are designed to operate at substantially the same rpm required for proper propeller performance, no additional transmission device is required between the engine and the propeller. On the other hand, rotary-piston engines, which afford many well-known advantages with respect to reciprocating-piston engines, operate at speeds 2 to 4 times higher than propeller operating speeds. Therefore, rotary engines are less satisfactory for propeller-driven aircraft propulsion because they require additional transmission mechanisms to convert engine operating speeds to propeller operating speeds. The additional weight and complexity of a transmission have greatly reduced the performance advantages of rotary-piston engines and, therefore, also their usefulness for normal propeller-driven aircraft applications.

No attempt has been made to convert a rotary-piston engine to a counter-rotating dual propeller system. U.S. Pat. No. 1,594,035 (Bailey) and No. 1,841,841 (Munn) describe unique rotary-type engines configured to allow the combustion chamber enclosure and rotor mechanisms to rotate about a stationary crankshaft. Neither patent describes a propulsion system that balances opposite torques internally. U.S. Pat. No. 1,461,436 (Messina) describes a rotary engine as a propulsion device for a craft that relies upon airframe manipulation to counteract the forces of adverse torque caused by the rotary-engine-driven propulsion system. Thus, the Messina patent does not describe a rotary, internal combustion propulsion system that resolves torque internally, either.

Therefore, there is still a need for a better implementation of the counter-rotating propeller approach to solving the dynamic balance problems experienced in aviation and other applications as a result of the torque imparted by a fixed engine on a supporting structure. This invention provides a novel approach based on the recognition that engines that do not require a crankshaft, such as rotary-piston engines, turbine engines, and electric motor engines, may be advantageously mounted on a fixed spindle.

BRIEF SUMMARY OF THE INVENTION

The primary goal of this invention is an engine propulsion system, especially for propeller driven aircraft, that balances opposing crankcase/crank torques internally and thereby transmits no resulting torque to the airframe.

Another objective is a counter-rotating engine wherein the absence of engine components with reciprocating radial motion prevents the accumulation of fluids in engine cavities, which hinders high-speed performance of the engine, as a result of centrifugal forces.

Another goal of the invention is a counter-rotating engine propulsion system, especially for propeller driven aircraft, that requires no additional component for transmission or speed reduction in order to achieve satisfactory propeller operation.

Another objective of the invention is a counter-rotating engine propulsion system, especially for propeller driven aircraft, that can be stably and safely journaled on a single spindle mounted on the frame of the aircraft.

Still another objective of the invention is a counter-rotating engine propulsion system, especially for propeller driven aircraft, that can be fueled and exhausted through internal ports that are fixed with respect to the aircraft's frame.

Another goal is a counter-rotating engine propulsion system, especially for propeller driven aircraft, that eliminates the need for auxiliary combustion-chamber temperature-distribution apparatus by providing a combustion-chamber enclosure that includes a plurality of internal cooling tubes which, during rotation of the enclosure, cause thermally conductive fluid to evenly distribute combustion chamber temperatures across the entire surface of the combustion chamber.

Yet another goal is a counter-rotating engine propulsion system, especially for propeller driven aircraft, that eliminates the need for auxiliary engine cooling mechanisms by providing a combustion-chamber housing that includes external cooling fins which, during rotation of the housing, cause sufficient air movement across the cooling fins to adequately cool the combustion chamber.

Finally, another goal of the invention is a counter-rotating engine propulsion system, especially for propeller driven aircraft, that eliminates the need for auxiliary combustion-air induction mechanisms by providing channels integral to either the combustion chamber enclosure or the crankshaft which, during rotation, cause combustible air to circulate under pressure into the combustion chamber.

Therefore, according to these and other objectives, one aspect of this invention consists of a counter-rotating rotary-piston engine having an output shaft with a cylindrical inner cavity rotatably mounted on a single support spindle in the frame of an aircraft. The output shaft extends substantially through the length of the engine block, which is suitably journaled on the shaft or the spindle to permit its counter-rotation. Internal combustion power is transmitted to the output shaft by means of an inner rotary piston fixed to the shaft which cooperates in conventional manner with an outer working chamber in the engine block, thereby producing concurrent rotation of the shaft and counter-rotation of the engine block. Dual propellers mounted on the shaft and on the block improve thrust performance, inherently balance the torques and moments of inertia of the two counter-rotating masses, and virtually eliminate any resultant torque to the aircraft.

According to another aspect of the invention, a counter-rotating turbine engine has an output shaft that is similarly rotatably mounted on a support spindle in the frame of an aircraft. The engine block is journaled on the shaft or the spindle to permit its counter-rotation. Turbine power generated by a pressurized fluid is transmitted to the output shaft by means of rotating vanes in the shaft that cooperate in conventional manner with corresponding stationary vanes in the engine block, thereby producing rotation of the shaft and counter-rotation of the engine block. As in the case of the rotary-piston engine, dual propellers are mounted on the shaft and on the block to improve thrust performance, balance the two counter-rotating masses, and virtually eliminate resultant torque.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 9 is a simplified partial cross-section of the gear mechanism driving the air intake pre-compression fan of the invention viewed from the right of the engine illustrated in FIG. 3.

DESCRIPTION OF THE PREFERRED EMBODIMENTS OF THE INVENTION

This invention lies in the recognition that an engine with an output shaft having a longitudinal inner cavity can be utilized to facilitate the counter-rotation of dual propellers mounted on the engine's shaft and block, respectively. This aspect of the invention can be achieved advantageously by a rotary-piston engine as well as by a turbine engine with a hollow output shaft journaled around a support spindle in a support structure. Accordingly, the invention is described mainly with reference to a rotary-piston engine, but the term rotary engine is intended to refer to a turbine engine as well.

Another aspect of the invention resides in the recognition that rotary engines, in the absence of an axial crankcase, provide an opportunity for lubrication of all internal parts of the engine without accumulation of oil and the corresponding centrifugal-force effects imposed by the rotation of the engine housing. Lubrication can be achieved by the use of porting from the stationary structure and appropriate channels throughout the engine.

Figure 1:
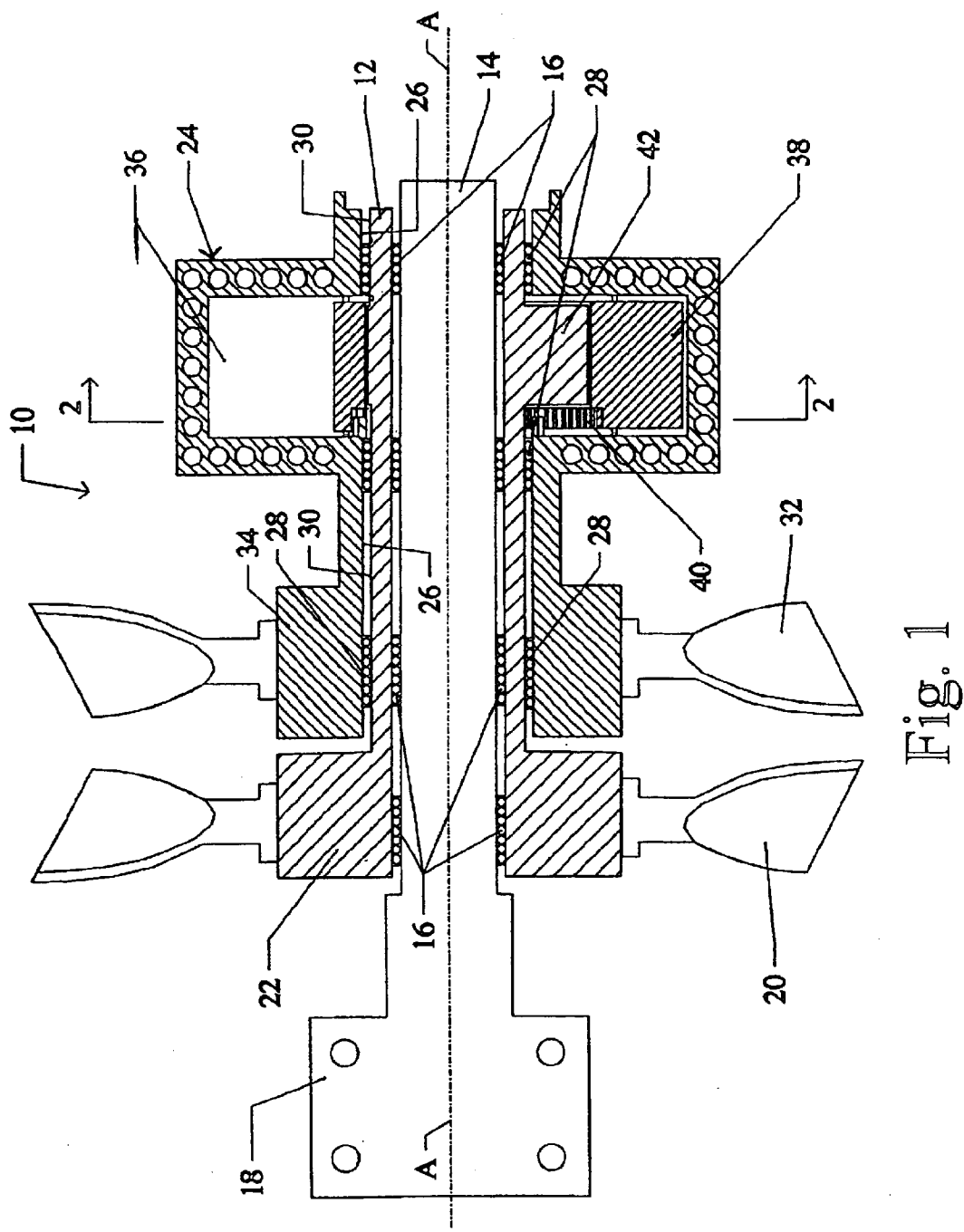
FIG. 1 is a simplified partially sectioned view of a counter-rotating dual-propeller rotary-piston/hollow-shaft engine mounted on a stationary spindle according to the present invention.
Figure 2:
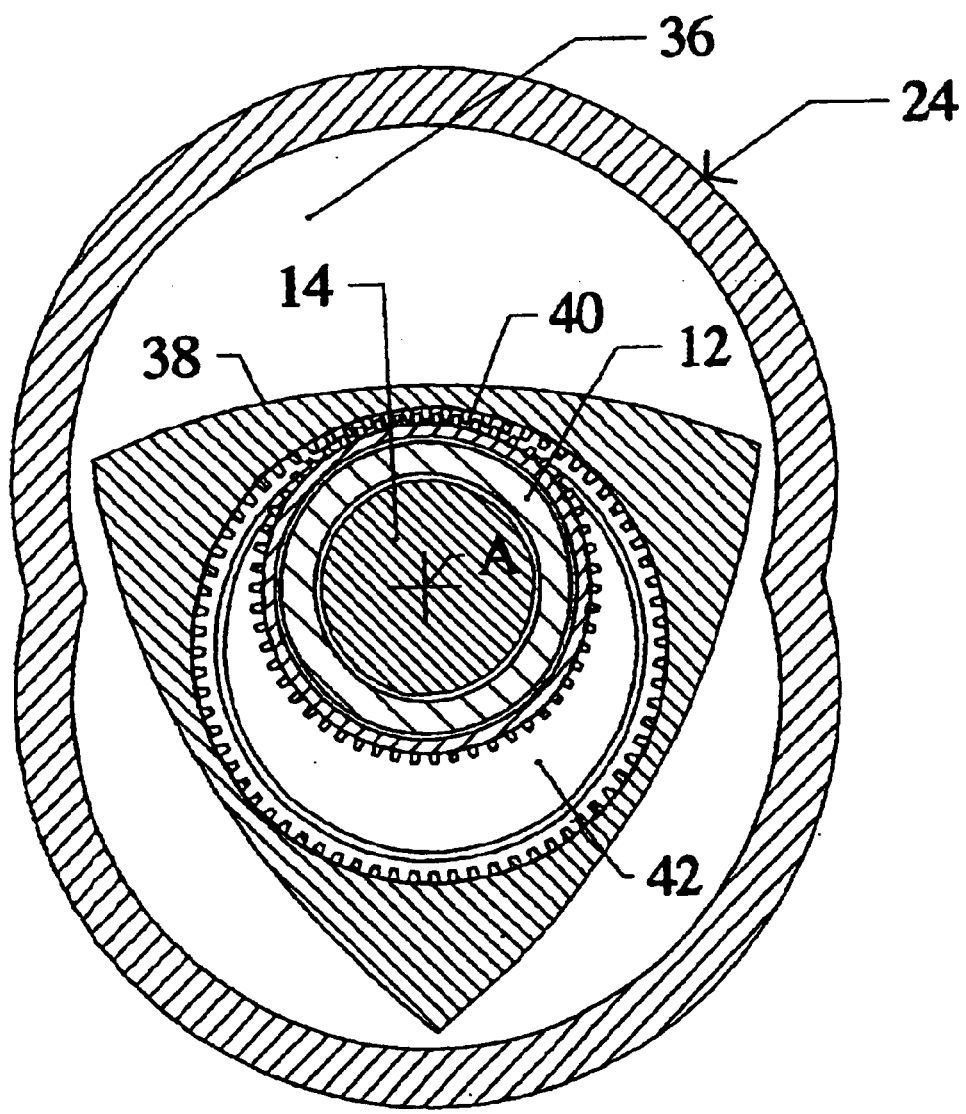
FIG. 2 is a sectional view of the engine of FIG. 1 as seen from line 2—2 in that figure.

As illustrated in simple schematic form in the cross-sections of FIGS. 1 and 2, an engine 10 according to the invention comprises a hollow output shaft 12 rotatably mounted on a substantially cylindrical, elongated support structure or spindle 14. The hollow cavity in the output shaft 12 defines a cylindrical surface that is advantageously journaled through annular bearings 16 over the outer surface of the stationary spindle 14 to permit rotation of the shaft 12 about the engine's longitudinal axis A. The spindle 14 is fixedly mounted on a stationary structure, such as the wing of an airplane, by means of a mounting block 18. The mounting block is illustrated on one side of the engine in FIG. 1, but, as one skilled in the art would readily understand, it could equivalently be placed on the other side, or on both sides of the engine. A first propeller 20 (shown partially cut-out in the figure) is fixed to an open portion 22 of the output shaft 12 to convert its rotation into useful propulsion.

The engine 10 consists of a rotary-piston combustion chamber of the type invented by Wankel et al. (U.S. Pat. No. 2,988,065, hereby incorporated by reference) and comprises an engine housing or block 24 rotatably mounted over the output shaft 12 by means of at least two concentric surfaces 26 journaled, through appropriate annular bearings 28, over cylindrical portions of the output shaft's outer surface 30. Thus, the block 24 is able to rotate around the shaft 12 concentrically with the shaft's own rotation about the engine's longitudinal axis A. A second propeller 32 (also shown partially cut-out) is fixed to an open portion 34 of the block 24 to also convert its rotation into useful propulsion. It is noted that as a result of this configuration each propeller 20, 32 rotates around the stationary spindle 14 with the structure to which it is attached (i.e., the shaft 12 and the block 24, respectively) and that the relative motion of the two is determined by the way the shaft and block are rotatably interconnected and by the relative mass and geometry of the respective rotating structures.

Still referring to FIGS. 1 and 2, the combustion chamber 36 of the engine 10 consists of a conventional rotary-piston configuration; accordingly, it will not be described in detail here beyond what is necessary to disclose the features of the invention. A multifaceted rotor 38 is adapted to rotate within the combustion chamber 36 in synchrony with a controlled planetary-gear system 40. The rotor 38 is journaled around an eccentric cam 42 which is fixed to or preferably integral with the output shaft 12. Thus, the rotor 38 is free to rotate concentrically around the cam 42 and, as those skilled in the art would readily understand, the rotation of the rotor 38 within the combustion chamber 36 causes a corresponding rotation of the cam 42 and of the output shaft 12. Therefore, as the normal sequence of its internal-combustion cycle occurs in the rotary engine 10, the output shaft 12 rotates in one direction, while the moment of inertia of the output shaft system causes the counter-rotation of the block 24 in the opposite direction. Obviously, operation of the engine 10 requires appropriate ignition and fuel-mixture inlet and exhaust porting, not shown in these drawings, as is well known in the art for operation of a Wankel engine.

Figure 3:
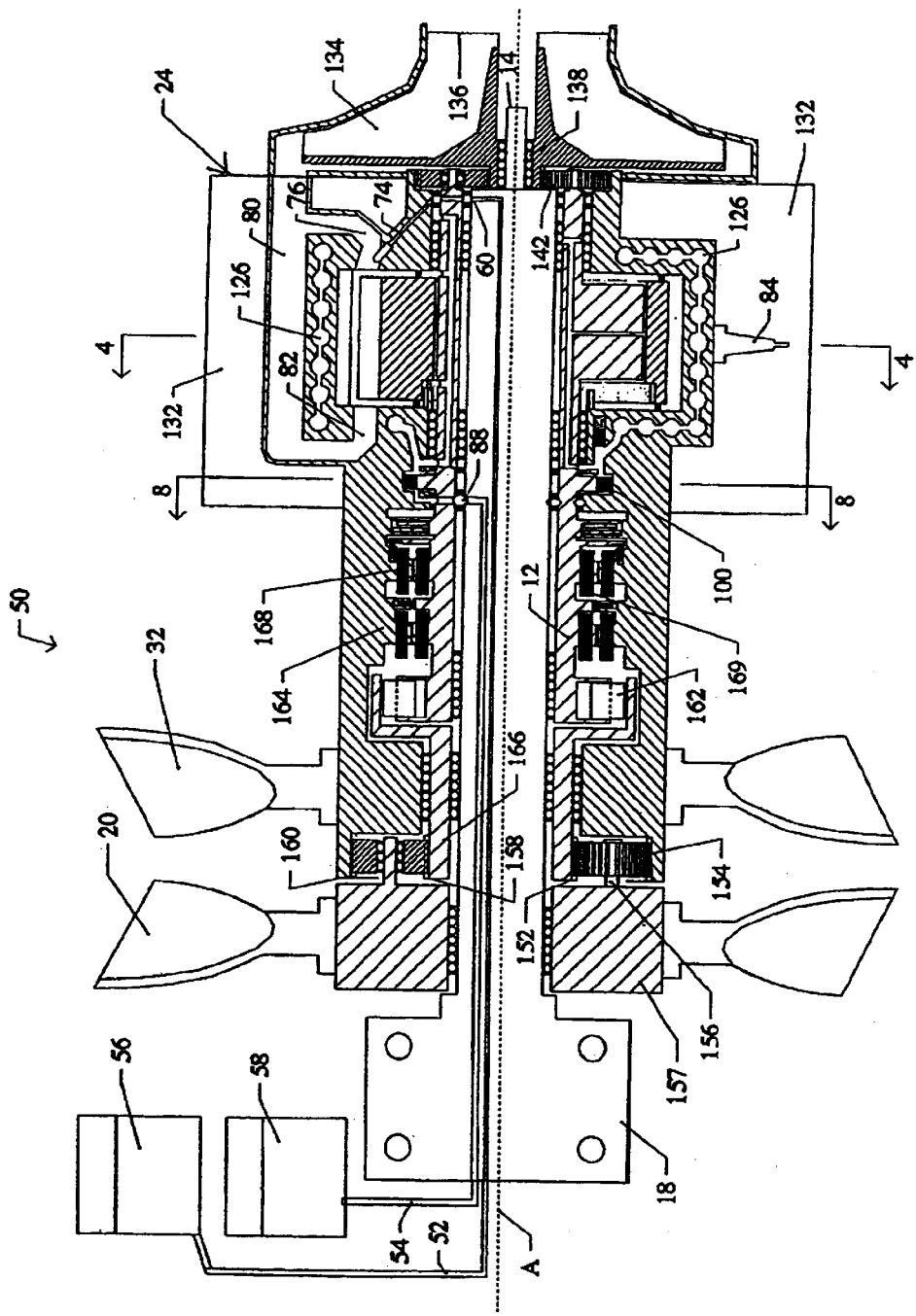
FIG. 3 is a simplified view of a counter-rotating dual-propeller rotary/hollow-shaft engine mounted on a stationary hollow spindle used for inlet and exhaust porting according to the present invention, the view being an elevational cross-section as seen from line 3—3 in FIG. 4.
Figure 4:
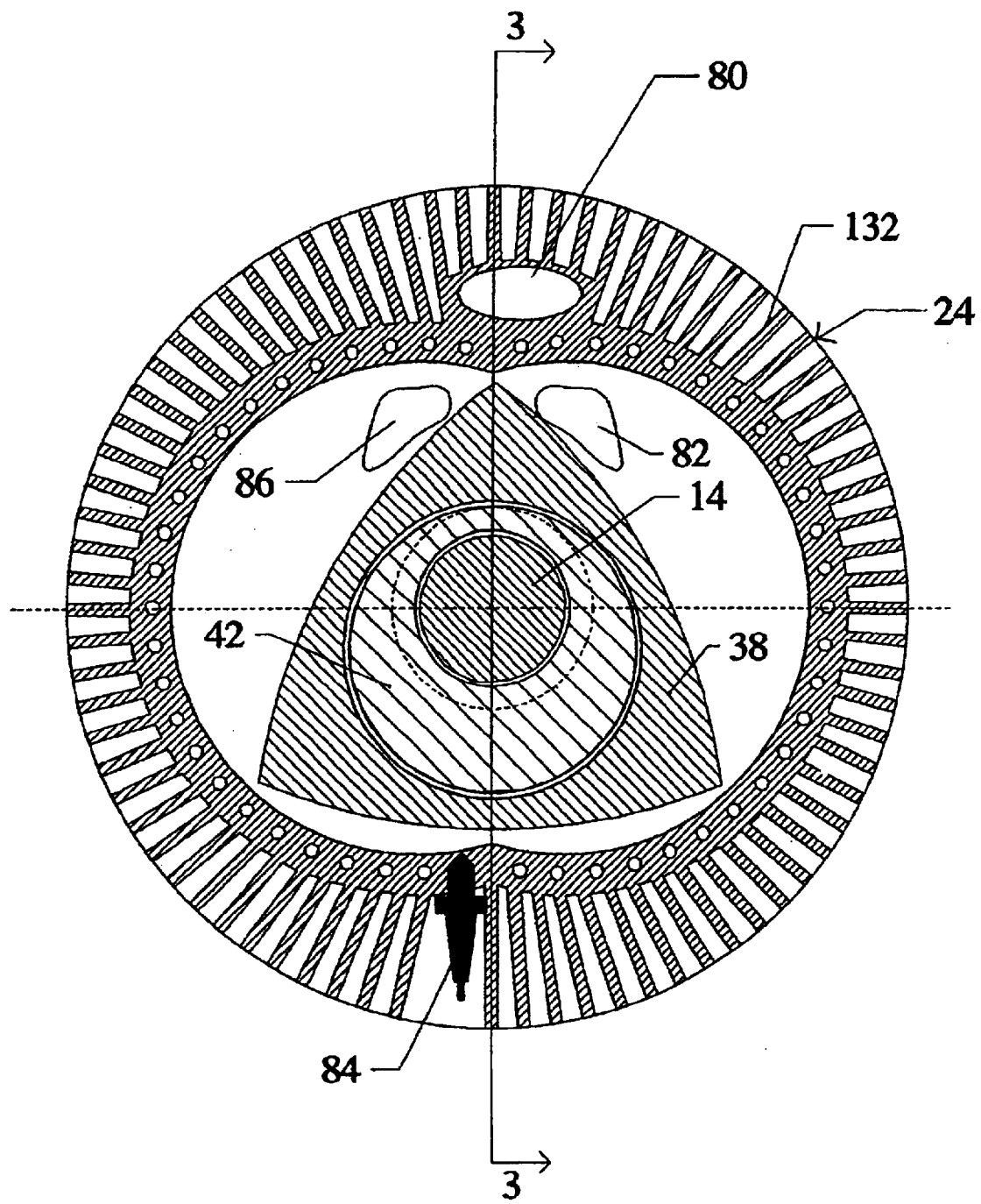
FIG. 4 is a sectional view of the engine of FIG. 3 as seen from line 4—4 in that figure to show the inlet and exhaust porting of the engine.
Figure 5:
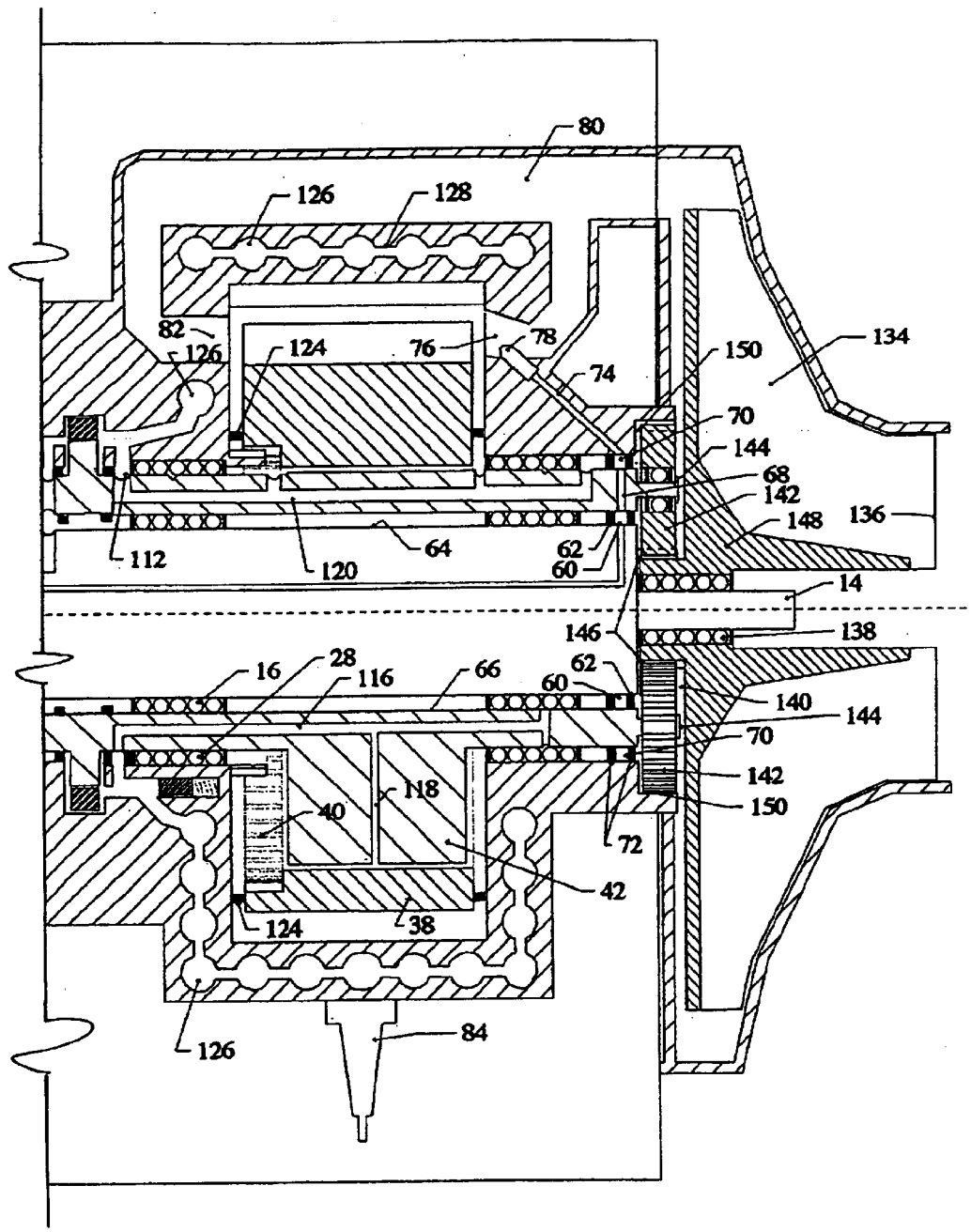
FIG. 5 is an enlarged view of the portion of FIG. 3 showing the channels and porting of the fuel system of the engine of the invention.
Figure 6:
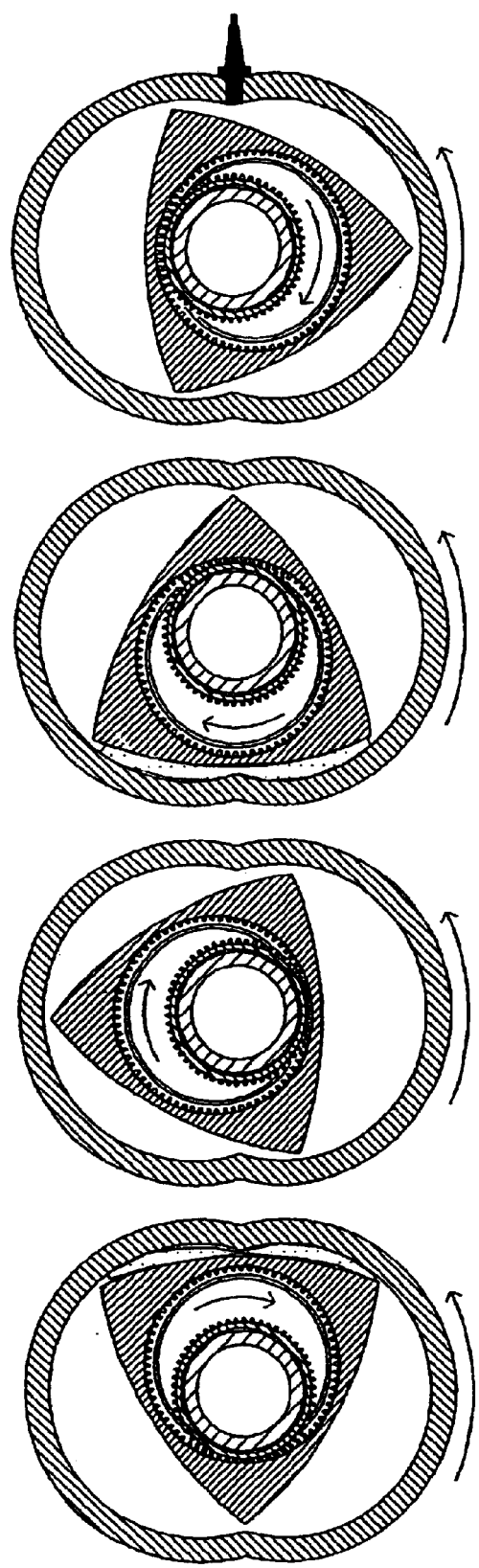
FIG. 6 is a schematic sequence of four views illustrating the relative motion of the rotor with respect to the block in a conventional rotary-piston engine.

Another significant contribution of the present invention, which becomes feasible because of the preferred engine mounting approach shown in FIG. 1, is the concept of utilizing the cavity in the output shaft 12 for porting the fuel mixture to the combustion chamber 36 and for exhausting the combustion products to the atmosphere. FIGS. 3, 4 and 5 illustrate the preferred embodiment 50 of the invention comprising such a system, wherein the rotor and block are rotated approximately 90 degrees with respect to the views of FIGS. 1 and 2. The stationary spindle 14, over which the output shaft 12 is journaled, is tubular, with an inlet cavity sufficiently large to provide a passageway for inlet fuel and lubrication lines 52 and 54, respectively, in fluid connection with corresponding stationary fuel and oil tanks 56 and 58, respectively. The fuel line 52 feeds a first annular channel 60 (better seen in the enlarged partial view of FIG. 5) defined by two O-ring seals 62 between the outer surface 64 of the spindle 14 and the inner surface 66 of the shaft 12. The channel 60 is connected by means of one or more radial ducts 68 in the body of the shaft 12 to a second annular channel 70 similarly formed by two O-ring seals 72 between the outer surface 30 of the shaft 12 and the inner surface of the engine block 24. The channel 70 is in turn further connected by means of a duct 74 in the body of the block 24 to an intake port 76 leading to the combustion chamber, where the fuel is delivered through an injector or other atomizing device 78. The port 76 is also connected to an air intake manifold 80 in fluid communication with the atmosphere, so that the fuel is mixed with air in the intake port 76 as well as with air supplied to the combustion chamber 36 through the opposing intake port 82. Thus, the combustion chamber 36 is carburated through the various rotating parts of the engine using a fuel source that is advantageously maintained in a stationary position. The operation of the engine is conventional; that is, the fuel mixture is aspirated, compressed, ignited by a spark plug or equivalent device 84, and exhausted to the atmosphere through an exhaust port 86 (seen in FIG. 4). Therefore, the sequence of these steps is not described in detail here, but it is nevertheless illustrated for convenience in FIG. 6.

The oil line 54 is similarly connected to the block 24 of the engine 50 by means of a first annular channel 88 (better seen in the enlarged partial view of FIG. 7) defined by two O-ring seals 90 between the spindle 14 and the shaft 12. The channel 88 is connected by means of one or more radial ducts 92 in the body of the shaft 12 to a second annular channel 94 formed by two O-ring seals 96 placed between the shaft 12 and the block 24. The channel 94 feeds the suction side 98 of a conventional Gerotor-type pump 100 mounted in an annular cavity between the shaft and block of the engine. As illustrated in the partial section view of FIG. 8, the pump 100 includes an outer stator ring 102 free floating within a slightly eccentric circular cavity 104 in the engine's block. An inner rotor 106, with one lobe fewer than the outer stator 102, is mounted over and fixed to the output shaft 12 by means of a key 108. As a result of this configuration, as the output shaft rotates with respect to the block, one half of the free space 110 between the stator/rotor 102, 106 provides suction while the other half provides pressure. Thus, the pump 100 is advantageously suitable for circulating lubricating oil through the engine 50 of the invention. It is noted that Gerotor-type pumps are used conventionally in hydraulic systems.

From the pump 100, the oil is distributed to various engine parts in need of lubrication and through a system of functionally parallel ducts that connect the pressure and suction sides of the pump. For example, through an annular channel 112, the oil is fed from the pressure side 114 of the pump 100 to a longitudinal duct 116 that lubricates the bearings 16, 28 and, through the radial duct 118 in the eccentric cam 42, maintains a continuous film of oil between abutting parts of the cam, the rotor 38, and the block 24, including the planetary-gear system 40 of the rotary engine. Another longitudinal duct 120 opposite to duct 116 provides a return to the suction side 122 of the pump 100. Sealing rings 124 prevent the radial diffusion of lubricating oil into the combustion chamber of the engine. This is greatly facilitated by the absence of oil accumulation behind the rings (which is a major contribution of the concept of the invention), even under the high centrifugal force produced by the rotation of the engine's components. Accordingly, this lubrication-system implementation of a rotary engine embodiment of the invention eliminates the problems caused by the centrifugal force in prior-art reciprocating-piston counter-rotating engines, where lubrication was severely hampered by the accumulation of oil at the periphery of the engine's block.

Figure 7:
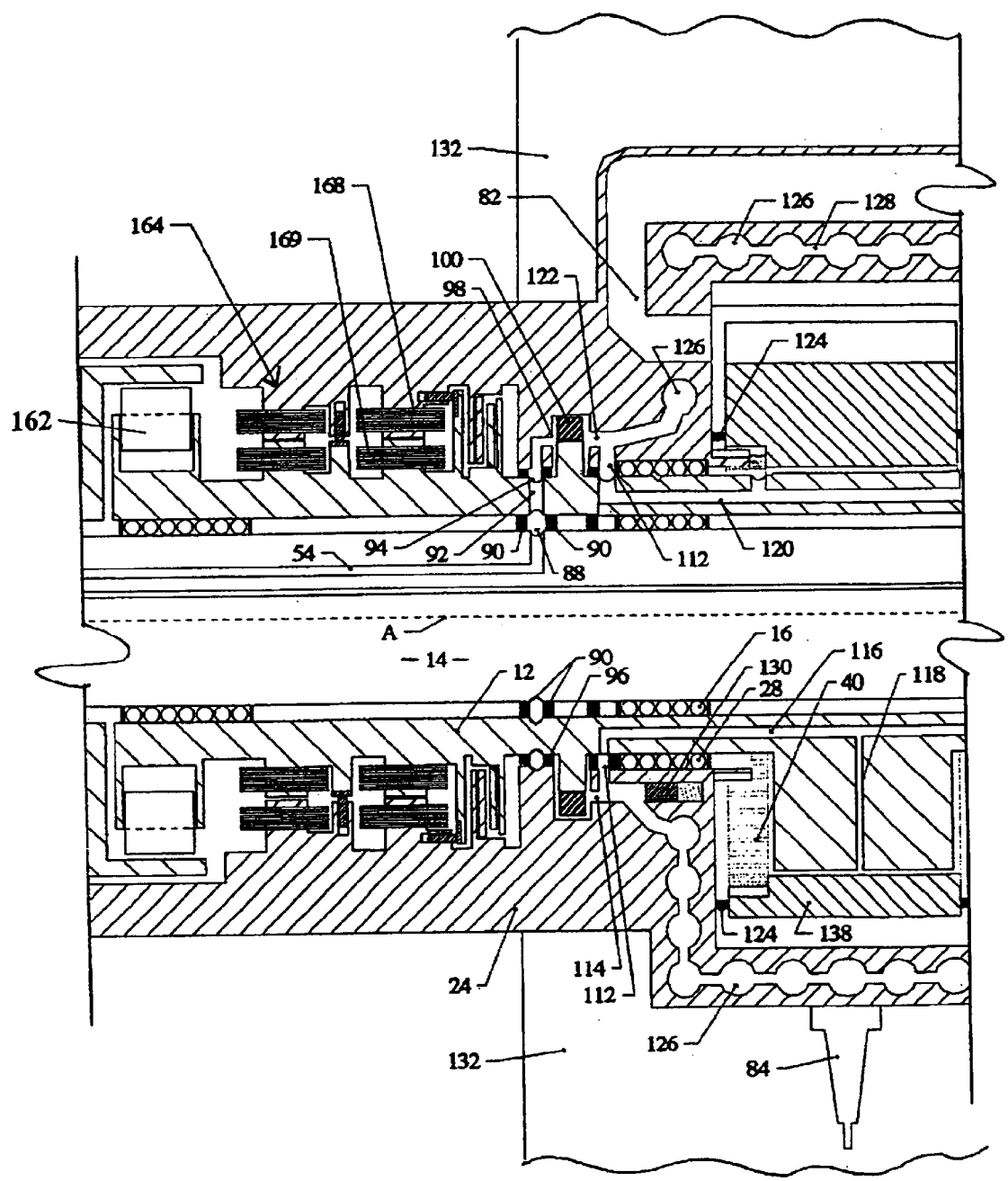
FIG. 7 is an enlarged view of the portion of FIG. 3 showing the channels and porting of the lubrication system of the engine of the invention.
Figure 8:
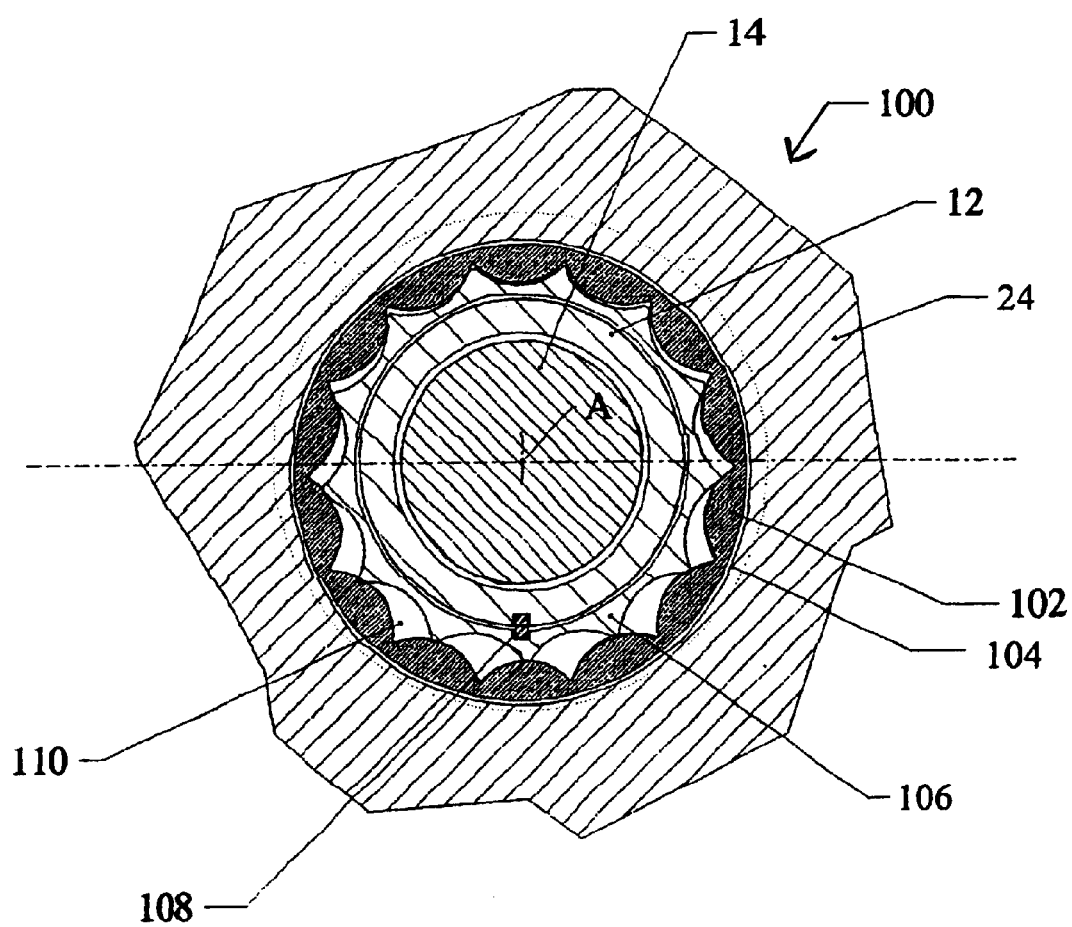
FIG. 8 is a sectional view, as seen from line 8—8 in FIG. 3, of the conventional Gerotor-type pump used to circulate the oil through the lubrication system of the engine of the invention.

According to another aspect of the present invention, lubrication oil is also circulated through the engine block 24 from the pressure side 114 to the suction sides 122 of the pump 100 in order to improve cooling and provide a more uniform temperature distribution through the block. As seen in FIGS. 3 and 7, the block of the engine is provided with annular radiator channels 126 distributed throughout the body of the block 24 and interconnected by longitudinal channel segments 128. The system of channels 126, 128 is configured so as to produce continuous flow of oil between the pressure side 114 of the pump 100 and its suction side 122. A spring-loaded valve 130 on the pressure side of the pump 100 regulates the circulation of oil through the cooling channels so that it flows only when the pump pressure is greater than a predetermined value (for example, 100 pounds), thereby ensuring preferential circulation through the lubrication system.

In addition, as illustrated in the sectional view of FIG. 4, the block 24 is also preferably provided with radiator fins 132 radially distributed from the outer surface of the block. Thus, the heat exchange resulting from the combined interaction of the rotating fins 132 with ambient air and the flow of oil in the channels 126 provides cooling to the engine and reduces the temperature gradient between the hot and cool portions of the engine. The fins 132 are preferably disposed at an angle with respect to the axis A of the engine, so as to provide a fan effect designed to enhance the efficiency of the propeller 32 associated with the rotating housing of the engine.

According to another aspect of the invention illustrated in FIGS. 3 and 5, the air to the intake manifold 80 is passed through a pre-compression (super-charger) fan 134 mounted on the stationary spindle 14 at the front of the engine 50. The fan 134 consists of multiple vanes adapted to compress ambient air as it passes from its front intake port 136 to the engine's manifold 80. The fan 134 is journaled over the tip of the spindle 14 by means of a conventional bearing 138 and is driven by a gear system 140 connected to both the output shaft 12 and the block 24 of the engine. As illustrated in FIG. 9 in simplified, partial cross-sectional view taken through the gears, the system 140 includes a set of intermediate gears 142 that are mounted on spindles 144 located off-axis in the output shaft 12 of the engine (see also FIG. 5, wherein only one of the gears 142 is sectioned). Each gear 142 meshes with an inner gear 146 (FIG. 5) in the structure 148 of the fan 134, and with an outer gear 150 in the block 24 of the engine. Thus, the rotation of the shaft 12 and the corresponding counter-rotation of the block 24 cause, through the cumulative effect of the interaction between all gears, to increase dramatically the rotational speed of the fan 134 with respect to the speed of each individual component, as one skilled in the art would readily understand. Obviously, the exact relative speed depends on the gear ratios adopted for gears 142, 146, 150.

Figure 10:
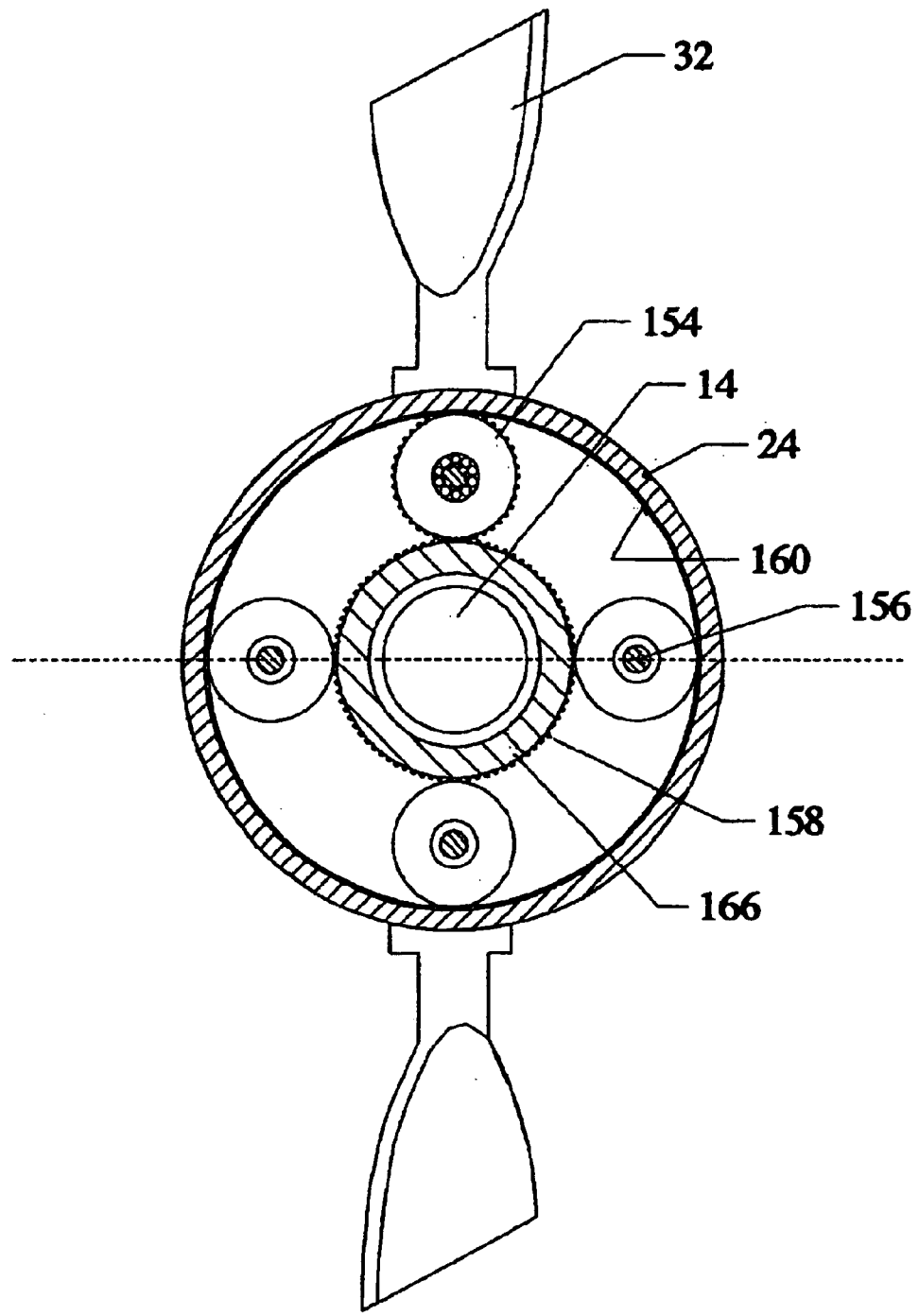
FIG. 10 is a simplified partial cross-section of the gear reduction mechanism driving the output-shaft fan of the invention viewed from the left of the engine illustrated in FIG. 3.
Figure 10:
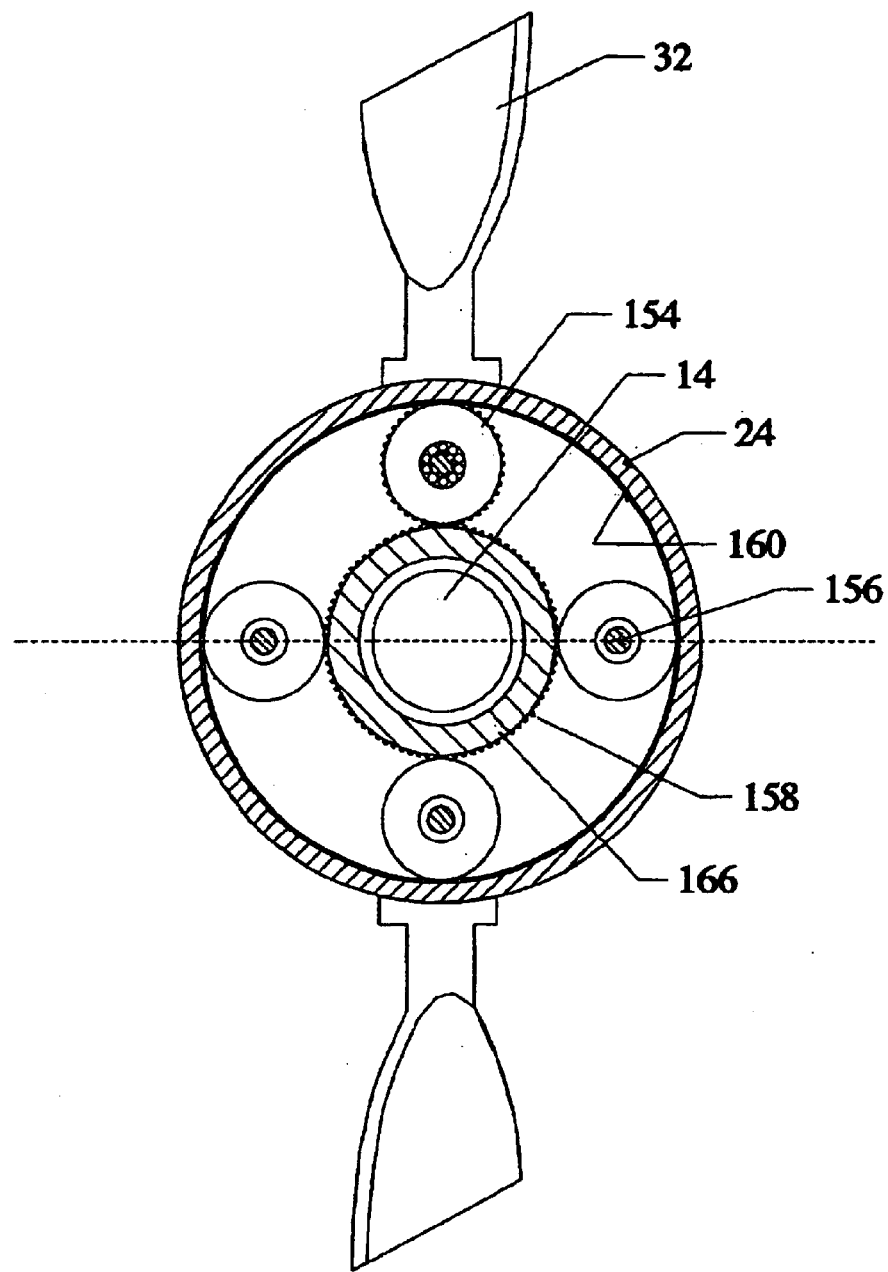

Still referring primarily to FIG. 3, the relative speeds of the output-shaft propeller 20 and the block propeller 32 can be varied, if deemed advantageous for a particular application, by the use of a gear reduction system 152 similar to the gear system 140 used to increase the speed of the fan 134. As better seen in FIG. 10, the system 152 includes a set of intermediate gears 154 mounted on axles 156 located off-axis in the structure 157 that supports the propeller 20. Each gear 154 meshes with an inner gear 158 associated with an extension 166 of the output shaft 12 (through a clutch, as detailed below) and with an outer gear 160 in the block 24 of the engine (which in turn rotates with the propeller 32). Thus, the rotation of the shaft 12 and the corresponding counter-rotation of the block 24 cause a reduction of the angular speed with which the axles 156 rotate about the stationary spindle 14. Again, as would be obvious to one skilled in the art, the exact relative speed depends on the gear ratios adopted for gears 154, 158, 160. FIG. 10 is a simplified, partial cross-sectional view taken from the left through the gears 154, 158, 160 to illustrate the relative position and operation of each component.

The engine 50 of FIG. 3 also illustrates an implementation of a clutch 162 and a starter 164 in the counter-rotating engine of the invention. The clutch 162 is shown schematically in the form of a conventional centrifugal clutch connecting the inner structure of the output shaft 12 with a shaft extension 166, such that expansion of the clutch mechanism causes the direct engagement of the extension 166 by the output shaft 12 and, correspondingly, the rotation of the propeller 20. The starter 164 also operates in known fashion through the electrical interaction between a conventional peripheral stator 168 attached to the block 24 and an inner armature 169 attached to the output shaft 12.

Figure 11:
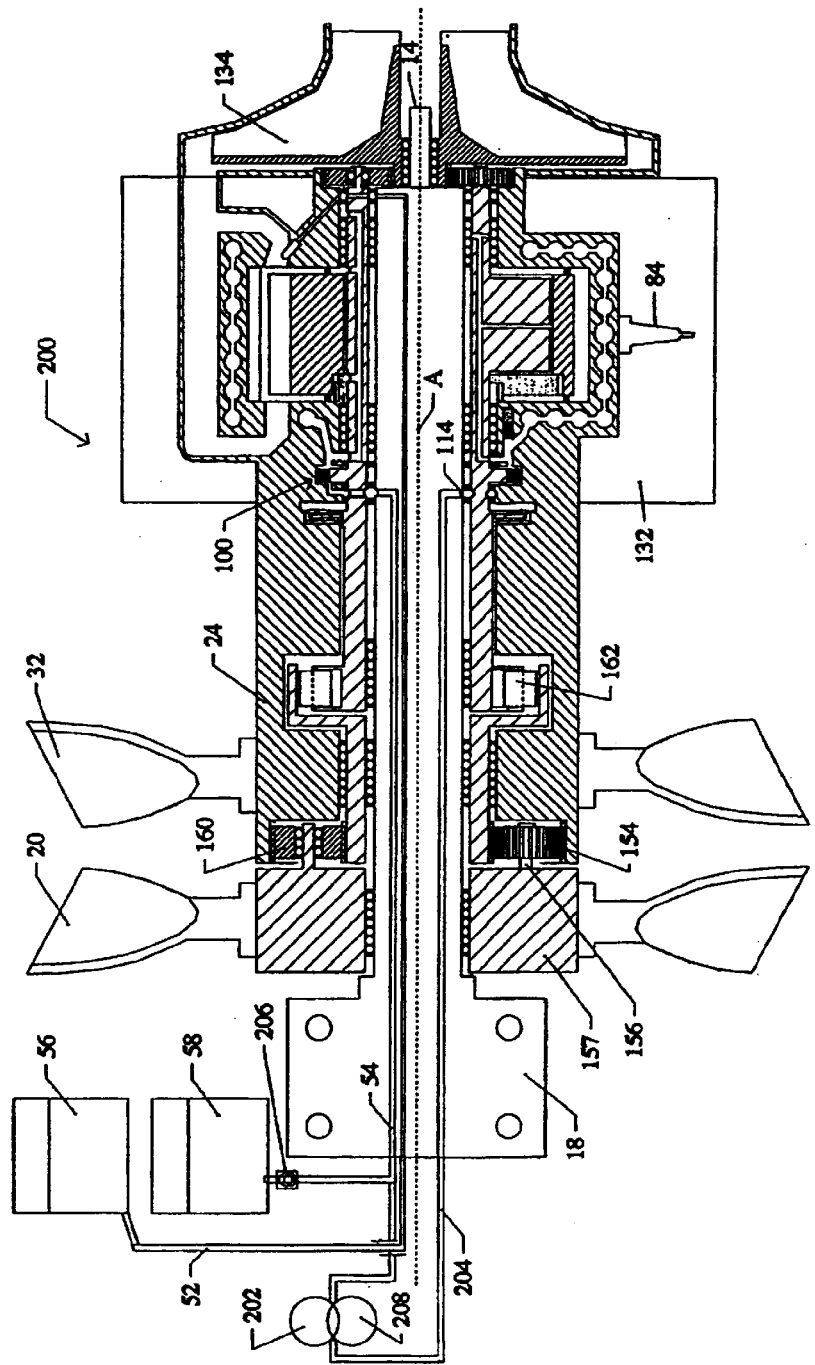
FIG. 11 is a simplified partially sectioned view of the engine of FIG. 3 wherein starter and alternator functions are provided by an oil pump and an alternator connected to the lubrication system through the stationary spindle.

In another embodiment 200 of the invention illustrated in FIG. 11, the starter 164 is eliminated from the block of the engine and replaced by a pump 202 in the oil line 54. In order to start the engine, the pump 202 is operated to pressurize the lubrication line 54 such that the oil pressure exerted on the suction side 98 of the Gerotor-type pump 100 mounted in the annular cavity between the shaft and the block of the engine (see FIG. 7) causes their relative rotation and counter-rotation, thereby cranking the engine to a start. The oil from the high pressure side 114 of the pump 100 is returned to the pump 202 by means of another line 204 in the stationary spindle 14. A check valve 206 is used to prevent back flow into the oil reservoir 58 during the cranking operation. Thus, the design of the engine 200 is greatly simplified and the engine may be started simply by driving the pump 202 with a motor or equivalent device 208.

In turn, the motor 208 may be adapted to function, in reverse, as an electrical generator. Thus, once the engine 200 is running, the lubrication system may also be used advantageously to produce electricity with the motor/generator 208 coupled to the lubrication lines 54, 204 through the pump 202. The pressure generated by the pump 100 in the engine is used to cause the rotation of the motor/generator 208 and produce electricity that may be stored in a battery (not shown) for use in conventional manner to run the motor/generator 208 and the pump 202 during the starting operation.

Thus, a novel rotary-piston counter-rotating engine has been described that is advantageously mounted on a single stationary spindle that extends through the entire length of the engine. This configuration provides a stable geometry for mounting the engine on a support structure such as an aircraft wing. The spindle further provides a convenient vehicle for transporting fuel to the combustion chamber of the engine and for distributing lubricant throughout the system from stationary sources outside the engine. As a result of the novel approach followed to lubricate the system, the oil is substantially contained within the axial core of the engine, except for the portion circulated as a coolant within the block, and the negative effects produced by sloshing fluid in reciprocating-piston counter-rotating engines are prevented. In the absence of engine components that move radially in direct opposition to centrifugal forces, and further in the absence of accumulation of fluids that counteract the motion of engine components, the engines of the invention are able to operate at much greater high-speed efficiency than heretofore disclosed in the prior art.

Figure 12:
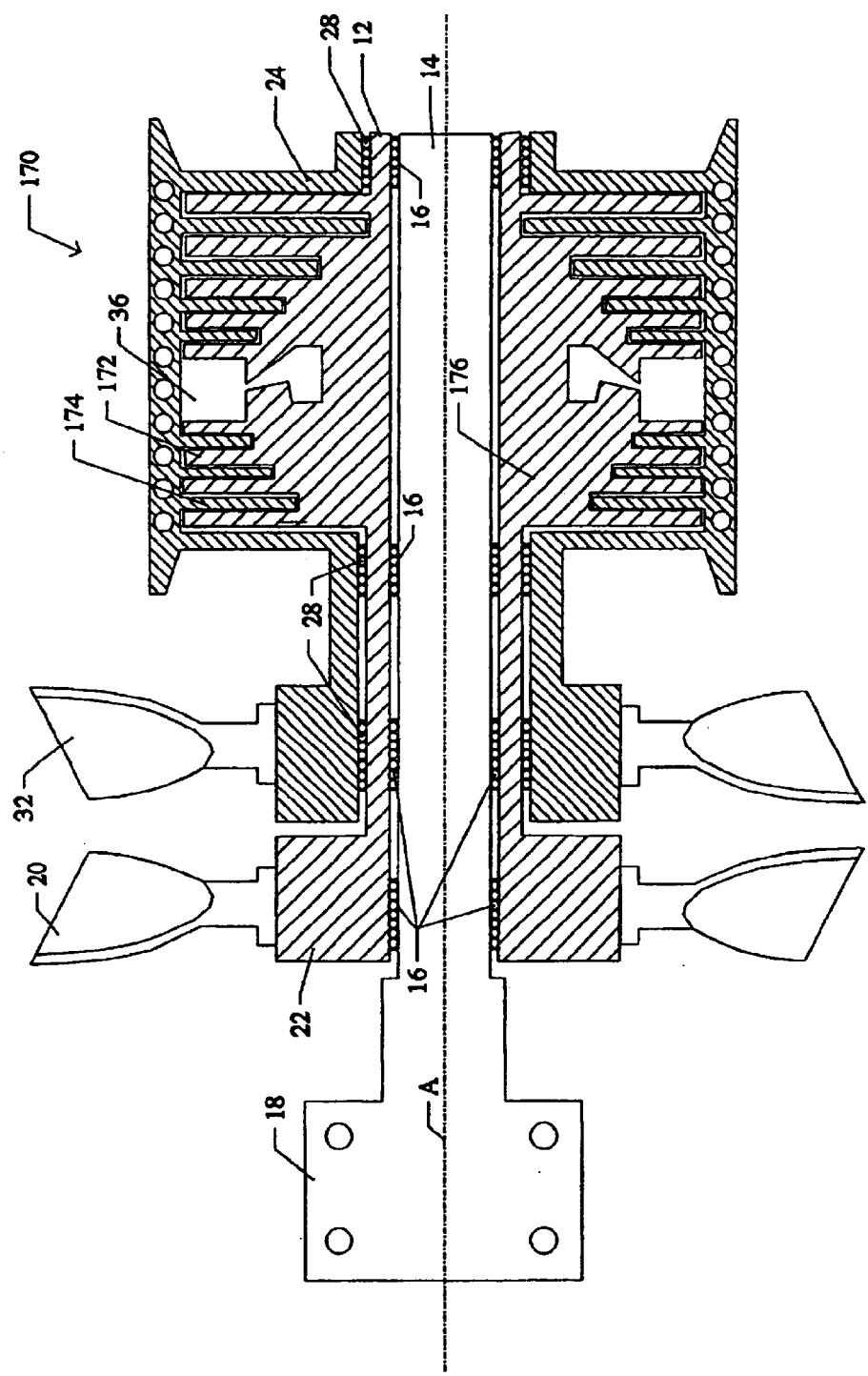
FIG. 12 is a simplified partially sectioned view of a counter-rotating dual-propeller rotary-turbine/hollow-shaft engine mounted on a stationary spindle according to the present invention.

As mentioned, the same advantages can be obtained in similar fashion with a counter-rotating turbine engine 170, as illustrated in schematic form in FIG. 12. The turbine engine 170 has an output shaft 12 that is rotatably mounted on a support spindle 12 through bearings 16, as in the embodiments of FIGS. 1 and 3. The engine block 24 is journaled on the shaft through bearings 28 to permit its counter-rotation. A pressurized gas is transmitted to the output shaft 12 by means of rotating vanes 172 integral to the shaft that cooperate in conventional manner with corresponding stationary vanes 174 in the engine block, thereby producing rotation of the shaft and counter-rotation of the engine block. A combustion chamber 36 is incorporated into an structure 176 integral with the output shaft 12. As in the case of the rotary-piston engine, dual propellers 20, 32 are mounted on the shaft and on the block to improve thrust performance, balance the two counter-rotating masses, and virtually eliminate resultant torque.

Figure 13:
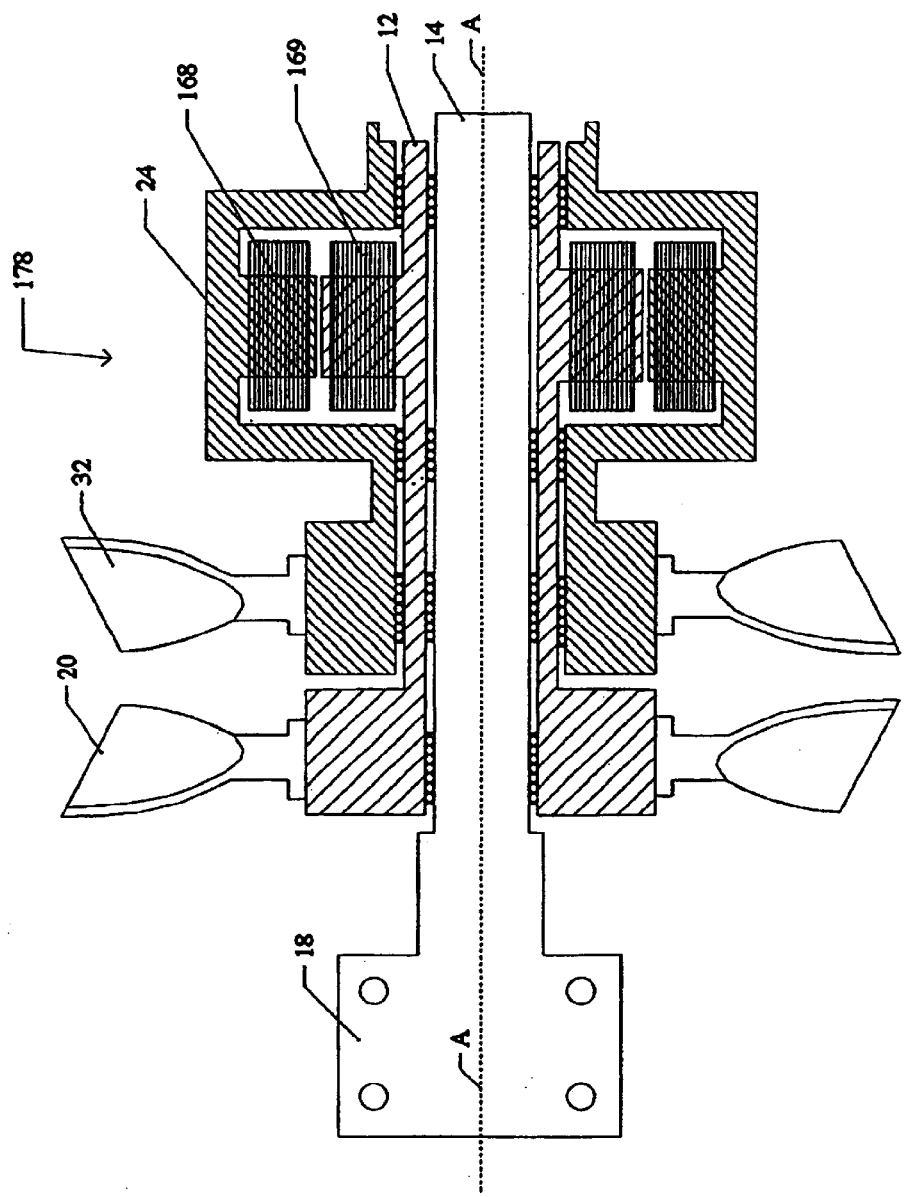
FIG. 13 is a simplified partially sectioned view of a counter-rotating dual-propeller electric-motor engine mounted on a stationary spindle according to the invention.
Figure 14:
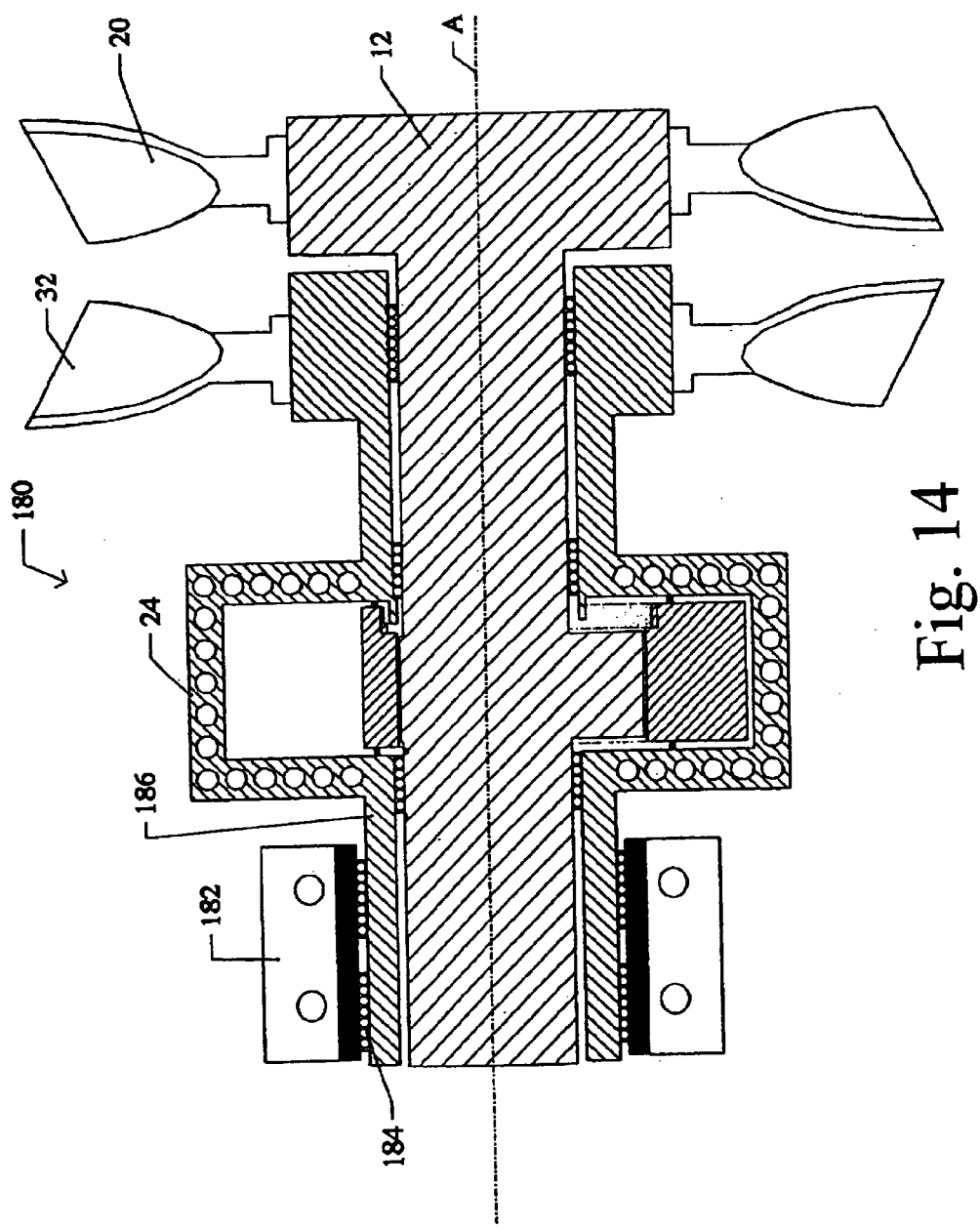
FIG. 14 is a simplified partially sectioned view of a counter-rotating dual-propeller rotary-piston engine mounted on a stationary structure journaled around the housing of the engine.
Figure 15:
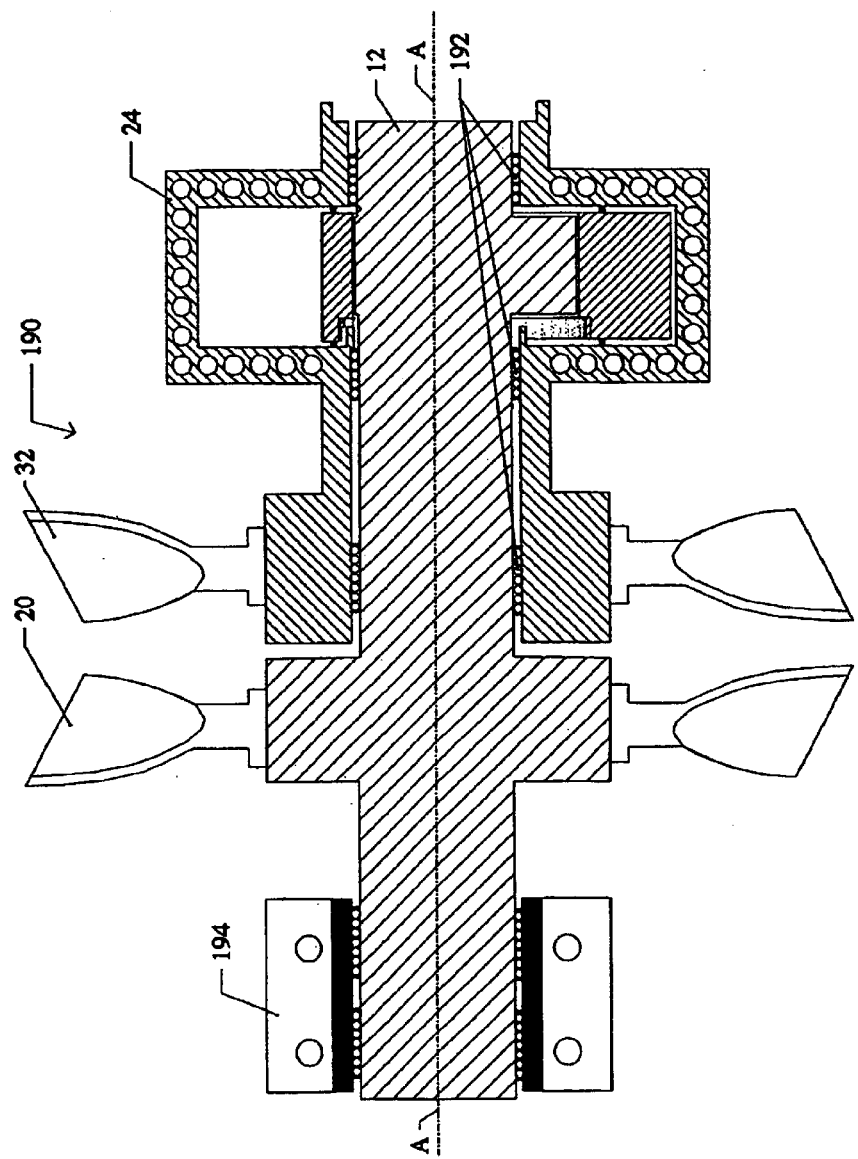
FIG. 15 is a simplified partially sectioned view of a counter-rotating dual-propeller rotary-piston engine mounted on a stationary structure journaled around the output shaft of the engine.

Various changes in the details, steps and components that have been described may be made by those skilled in the art within the principles and scope of the invention herein illustrated and defined in the appended claims. For example, FIG. 13 illustrates a stationary-spindle embodiment 178 of the invention wherein an electric motor is used to generate propulsion. A conventional combination of a stator 168 and armature 169 affixed to the engine's block 24 and output shaft 12, respectively, produce the rotation and counter-rotation of the parts and of the propellers 20, 32 affixed to them. Moreover, the general concepts of the invention could be implemented in equivalent fashion, though not preferred, by different mounting arrangements to stationary structures. FIG. 14 illustrates schematically a rotary engine 180 wherein the block 24 and corresponding propeller 32 are rotatably mounted on a stationary structure 182 through bearings 184 that surround a cylindrical outer surface 186 of the block. In turn, the output shaft 12 is journaled within the block 24, as in the previous embodiments, thereby allowing the corresponding propeller 20 to counter-rotate with respect to the block. Similarly, FIG. 15 illustrates schematically another embodiment wherein the block 24 and corresponding propeller 32 a rotary engine 190 are rotatably mounted on the output shaft 12 through bearings 192. In turn, the output shaft 12 is journaled within a stationary structure 194 that supports the entire engine, thereby allowing the propeller 20 attached to the shaft 12 to counter-rotate with respect to the propeller 32 in the block.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. An engine with counter-rotating housing and output shaft, comprising the following combination of components:
   (a) an elongated stationary spindle rigidly attached to a support structure;
   (b) a hollow output shaft extending through a length of the engine and journaled about said spindle for concentric rotation around the spindle;
   (c) a housing journaled about said output shaft for concentric counter-rotation around the shaft; and
   (d) means for producing said concentric rotation and counter-rotation as a result of a process of energy conversion;
   whereby during operation of the engine an inertial balance is established between said output shaft and said housing by rotating in opposite directions concentrically with respect to said stationary spindle;
   wherein said engine is a rotary-piston engine and said process of energy conversion includes combustion of a fuel in a combustion chamber.

2. The engine of claim 1, further including an air intake pre-compression fan driven by said rotation of the output shaft and counter-rotation of the housing of the engine.

3. The engine of claim 1, further including oil distribution channels through the housing to provide cooling to the engine.

4. The engine of claim 1, further including a gear reduction mechanism between said output shaft and housing of the engine.

5. The engine of claim 1, wherein the engine includes a lubrication system supplying oil to the engine through the spindle from a stationary source, an oil pump driven by said rotation of the output shaft and counter-rotation of the housing, an air intake pre-compression fan driven by said rotation of the output shaft and counter-rotation of the housing, oil distribution channels through the housing to provide cooling to the engine, and a gear reduction mechanism between said output shaft and housing of the engine.

6. The engine of claim 1, further including a lubrication system supplying oil to the engine through the spindle from a stationary source.

7. The engine of claim 6, further including a first oil pump driven by said rotation of the output shaft and counter-rotation of the housing of the engine.

8. The engine of claim 7, further including a second oil pump connected to the first oil pump through said lubrication system, wherein upon activation the second oil pump pressurizes the first oil pump and causes a relative rotation of the output shaft and counter-rotation of the housing to start the engine.

9. The engine of claim 8, further including a generator coupled to the second oil pump, such that during operation of the engine the first oil pump pressurizes the second oil pump and the second oil pump drives the generator to produce electricity.

10. An engine with counter-rotating housing and output shaft, comprising the following combination of components:
(a) an elongated stationary spindle rigidly attached to a support structure;
(b) a hollow output shaft extending through a length of the engine and journaled about said spindle for concentric rotation around the spindle;
(c) a housing journaled about said output shaft for concentric counter-rotation around the shaft; and
(d) means for producing said concentric rotation and counter-rotation as a result of a process of energy conversion;
whereby during operation of the engine an inertial balance is established between said output shaft and said housing by in opposite directions concentrically with respect to said stationary spindle;
wherein said engine is a rotary-turbine engine and said process of energy conversion includes combustion of a fuel in a combustion chamber.

11. The engine of claim 10, further including an air intake pre-compression fan driven by said rotation of the output shaft and counter-rotation of the housing of the engine.

12. The engine of claim 10, further including oil distribution channels through the housing to provide cooling to the engine.

13. The engine of claim 10, further including a gear reduction mechanism between said output shaft and housing of the engine.

14. The engine of claim 10, further including a lubrication system supplying oil to the engine through the spindle from a stationary source.

15. The engine of claim 14, further including a first oil pump driven by said rotation of the output shaft and counter-rotation of the housing of the engine.

16. The engine of claim 15, further including a second oil pump connected to the first oil pump through said lubrication system, wherein upon activation the second oil pump pressurizes the first oil pump and causes a relative rotation of the output shaft and counter-rotation of the housing to start the engine.

17. The engine of claim 16, further including a generator coupled to the second oil pump, such that during operation of the engine the first oil pump pressurizes the second oil pump and the second oil pump drives the generator to produce electricity.

18. An engine with counter-rotating housing and output shaft, comprising the following combination of components:
(a) an elongated stationary spindle rigidly attached to a support structure;
(b) a hollow output shaft extending through a length of the engine and journaled about said spindle for concentric rotation around the spindle;
(c) a housing journaled about said output shaft for concentric counter-rotation around the shaft; and
(d) means for producing said concentric rotation and counter-rotation as a result of a process of energy conversion;
whereby during operation of the engine an inertial balance is established between said output shaft and said housing by rotating in opposite directions concentrically with respect to said stationary spindle;
wherein said engine is an electric-motor engine.

19. The engine of claim 18, further including an air intake pre-compression fan driven by said rotation of the output shaft and counter-rotation of the housing of the engine.

20. The engine of claim 18, further including oil distribution channels through the housing to provide cooling to the engine.

21. The engine of claim 18, further including a gear reduction mechanism between said output shaft and housing of the engine.

22. The engine of claim 18, further including a lubrication system supplying oil to the engine through the spindle from a stationary source.

23. The engine of claim 22, further including a first oil pump driven by said rotation of the output shaft and counter-rotation of the housing of the engine.

24. The engine of claim 23, further including a second oil pump connected to the first oil pump through said lubrication system, wherein upon activation the second oil pump pressurizes the first oil pump and causes a relative rotation of the output shaft and counter-rotation of the housing to start the engine.

25. The engine of claim 24, further including a generator coupled to the second oil pump, such that during operation of the engine the first oil pump pressurizes the second oil pump and the second oil pump drives the generator to produce electricity.

26. An engine with counter-rotating housing and output shaft, comprising the following combination of components:
(a) an output shaft extending through a length of the engine;
(b) a housing journaled about said output shaft for concentric rotation around the output shaft;
(c) a stationary structure for supporting the engine in journaled arrangement to permit said rotation of the housing and a corresponding counter-rotation of the output shaft around an axis of rotation; and
(d) means for producing said rotation of the housing and corresponding counter-rotation of the output shaft as a result of a process of energy conversion, said means comprising no component that reciprocates in a radial direction with respect to said axis of rotation;
whereby during operation of the engine an inertial balance is established between said output shaft and said housing by rotating in opposite directions concentrically with respect to said stationary structure, and wherein an absence of components that reciprocate in a radial direction with respect to the axis of rotation prevents accumulation of oil that counters said rotation of the housing and counter-rotation of the output shaft;
wherein said engine is a rotary-piston engine and said process of energy conversion includes combustion of a fuel in a combustion chamber.

27. The engine of claim 26, further including a fuel distribution system extending radially from a supply conduit inside said output shaft.

28. The engine of claim 26, further including an oil pump driven by said rotation of the output shaft and counter-rotation of the housing of the engine.

29. The engine of claim 26, further including an air intake pre-compression fan driven by said rotation of the output shaft and counter-rotation of the housing of the engine.

30. The engine of claim 26, further including oil distribution channels through the housing to provide cooling to the engine.

31. The engine of claim 26, further including a gear reduction mechanism between said output shaft and housing of the engine.

32. The engine of claim 26, further comprising means for providing lubrication from a stationary source through an oil distribution system extending radially from a supply conduit inside said output shaft.

33. The engine of claim 26, wherein the engine includes a fuel distribution system extending radially from a supply conduit inside the output shaft, an oil pump driven by said rotation of the output shaft and counter-rotation of the housing, an air intake pre-compression fan driven by said rotation of the output shaft and counter-rotation of the housing, oil distribution channels through the housing to provide cooling to the engine, and a gear reduction mechanism between said output shaft and housing of the engine.

34. An engine with counter-rotating housing and output shaft, comprising the following combination of components:
   (a) an output shaft extending through a length of the engine;
   (b) a housing journaled about said output shaft for concentric rotation around the output shaft;
   (c) a stationary structure for supporting the engine in journaled arrangement to permit said rotation of the housing and a corresponding counter-rotation of the output shaft around an axis of rotation; and
   (d) means for producing said rotation of the housing and corresponding counter-rotation of the output shaft as a result of a process of energy conversion, said means comprising no component that reciprocates in a radial direction with respect to said axis of rotation;
   whereby during operation of the engine an inertial balance is established between said output shaft and said housing by rotating in opposite directions concentrically with respect to said stationary structure, and wherein an absence of components that reciprocate in a radial direction with respect to the axis of rotation prevents accumulation of oil that counters said rotation of the housing and counter-rotation of the output shaft;
   wherein said engine is a rotary-turbine engine and said process of energy conversion includes combustion of a fuel in a combustion chamber.

35. The engine of claim 34, further including a fuel distribution system extending radially from a supply conduit inside said output shaft.

36. The engine of claim 34, further including an oil pump driven by said rotation of the output shaft and counter-rotation of the housing of the engine.

37. The engine of claim 34, further including an air intake pre-compression fan driven by said rotation of the output shaft and counter-rotation of the housing of the engine.

38. The engine of claim 34, further including oil distribution channels through the housing to provide cooling to the engine.

39. The engine of claim 34, further including a gear reduction mechanism between said output shaft and housing of the engine.

40. The engine of claim 34, further comprising means for providing lubrication from a stationary source through an oil distribution system extending radially from a supply conduit inside said output shaft.

41. The engine of claim 34, further including a fuel distribution system extending radially from a supply conduit inside the output shaft, an oil pump driven by said rotation of the output shaft and counter-rotation of the housing, an air intake pre-compression fan driven by said rotation of the output shaft and counter-rotation of the housing, oil distribution channels through the housing to provide cooling to the engine, and a gear reduction mechanism between said output shaft and housing of the engine.

42. An engine with counter-rotating housing and output shaft, comprising the following combination of components:
   (a) an output shaft extending through a length of the engine;
   (b) a housing journaled about said output shaft for concentric rotation around the output shaft;
   (c) a stationary structure for supporting the engine in journaled arrangement to permit said rotation of the housing and a corresponding counter-rotation of the output shaft around an axis of rotation; and
   (d) means for producing said rotation of the housing and corresponding counter-rotation of the output shaft as a result of a process of energy conversion, said means comprising no component that reciprocates in a radial direction with respect to said axis of rotation;
   whereby during operation of the engine an inertial balance is established between said output shaft and said housing by rotating in opposite directions concentrically with respect to said stationary structure, and wherein an absence of components that reciprocate in a radial direction with respect to the axis of rotation prevents accumulation of oil that counters said rotation of the housing and counter-rotation of the output shaft;
   wherein said engine is an electric-motor engine.

43. The engine of claim 42, further including an oil pump driven by said rotation of the output shaft and counter-rotation of the housing of the engine.

44. The engine of claim 42, further including an air intake pre-compression fan driven by said rotation of the output shaft and counter-rotation of the housing of the engine.

45. The engine of claim 42, further including oil distribution channels through the housing to provide cooling to the engine.

46. The engine of claim 42, further including a gear reduction mechanism between said output shaft and housing of the engine.

47. The engine of claim 42, further comprising means for providing lubrication from a stationary source through an oil distribution system extending radially from a supply conduit inside said output shaft.

48. The engine of claim 42, further including an oil pump driven by said rotation of the output shaft and counter-rotation of the housing, an air intake pre-compression fan driven by said rotation of the output shaft and counter-rotation of the housing, oil distribution channels through the housing to provide cooling to the engine, and a gear reduction mechanism between said output shaft and housing of the engine.

49. A rotary-piston internal combustion engine with counter-rotating housing and output shaft, comprising the following combination of components:
   (a) an elongated stationary spindle rigidly attached to a support structure;
   (b) a hollow output shaft extending through a length of the engine and journaled about said spindle for concentric rotation around the spindle, said output shaft comprising a cam;

(c) a combustion-chamber housing journaled about said output shaft for concentric rotation around the shaft, said housing comprising a combustion chamber for internal combustion of a fuel; and (d) rotary-piston means for exerting a pressure against said cam in response to combustion of fuel in said combustion chamber;

whereby during operation of the engine an inertial balance is established between said output shaft and said housing by rotating in opposite directions concentrically with respect to said stationary spindle.

50. The engine of claim 49, wherein said rotary-piston means consists of a rotor journaled around said cam and rotatably mounted in a planetary-gear system in said combustion chamber.

51. The engine of claim 49, further including a lubrication system supplying oil to the engine through the spindle from a stationary source.

52. The engine of claim 49, further including an oil pump driven by said rotation of the output shaft and housing of the engine.

53. The engine of claim 49, further including an air intake pre-compression fan driven by said rotation of the output shaft and housing of the engine.

54. The engine of claim 49, further including oil distribution channels through the housing to provide cooling to the engine.

55. The engine of claim 49, further including a gear reduction mechanism between said output shaft and housing of the engine.

56. The engine of claim 49, wherein said rotary-piston means consists of a rotor journaled around said cam and rotatably mounted in a planetary-gear system in said combustion chamber; and wherein the engine further includes a lubrication system supplying oil to the engine through the spindle from a stationary source, an oil pump driven by said rotation of the output shaft and housing of the engine, an air intake pre-compression fan driven by said rotation of the output shaft and housing of the engine, oil distribution channels through the housing to provide cooling to the engine, and a gear reduction mechanism between said output shaft and housing of the engine.

57. A method of mounting a rotary engine with counter-rotating housing and output shaft, comprising the following steps:

(a) providing an elongated stationary spindle rigidly attached to a support structure;

(b) providing a hollow output shaft extending through a length of the engine and journaled about said spindle for concentric rotation around the spindle, said output shaft comprising a cam;

(c) providing a combustion-chamber housing journaled about said output shaft for concentric rotation around the shaft, said housing comprising a combustion chamber for internal combustion of a fuel; and (d) providing rotary-piston means for exerting a pressure against said cam in response to combustion of fuel in said combustion chamber;

whereby during operation of the engine an inertial balance is established between said output shaft and said housing by rotating in opposite directions concentrically with respect to said stationary spindle.

* * * * *